(12) United States Patent
Ackerly

(10) Patent No.: US 8,589,673 B2
(45) Date of Patent: Nov. 19, 2013

(54) METHODS AND SYSTEMS FOR DISTRIBUTING CRYPTOGRAPHIC DATA TO AUTHENTICATED RECIPIENTS

(75) Inventor: William Rodgers Ackerly, Washington, DC (US)

(73) Assignee: VirTru Corporation, Washington, DC (US)

( * ) Notice: Subject to any disclaimer, the term of this patent is extended or adjusted under 35 U.S.C. 154(b) by 0 days.

(21) Appl. No.: 13/340,732

(22) Filed: Dec. 30, 2011

(65) Prior Publication Data

US 2012/0179905 A1    Jul. 12, 2012

Related U.S. Application Data

(60) Provisional application No. 61/432,181, filed on Jan. 12, 2011.

(51) Int. Cl.
*H04L 29/06* (2006.01)
(52) U.S. Cl.
USPC .......................................................... 713/155
(58) Field of Classification Search
USPC .......................................................... 713/155
See application file for complete search history.

(56) References Cited

U.S. PATENT DOCUMENTS

| | | |
|---|---|---|
| 7,774,411 B2 | 8/2010 | LeMay et al. |
| 7,844,832 B2 | 11/2010 | Nation et al. |
| 7,913,311 B2 | 3/2011 | Alain et al. |
| 7,921,288 B1 | 4/2011 | Hildebrand |
| 7,921,450 B1 | 4/2011 | Vainstein et al. |
| 2003/0149781 A1 * | 8/2003 | Yared et al. .................. 709/229 |
| 2004/0034776 A1 | 2/2004 | Fernando et al. |
| 2004/0186997 A1 | 9/2004 | Todaka |
| 2007/0074270 A1 | 3/2007 | Meehan et al. |
| 2007/0118735 A1 | 5/2007 | Cherrington et al. |
| 2008/0005024 A1 | 1/2008 | Kirkwood |
| 2008/0086646 A1 * | 4/2008 | Pizano .......................... 713/189 |
| 2008/0151110 A1 | 6/2008 | Hasegawa et al. |
| 2009/0055924 A1 | 2/2009 | Trotter |
| 2009/0106549 A1 | 4/2009 | Mohamed |
| 2010/0153739 A1 | 6/2010 | Guymon, Jr. et al. |
| 2011/0040964 A1 | 2/2011 | Nussbaum et al. |
| 2011/0040967 A1 | 2/2011 | Waller et al. |

OTHER PUBLICATIONS

Nobelis et al., "Decentralized Access Right Management for Workflow Applications," 2005, https://nyx.unice.fr/publis/nobelis-boudaoud-etal:2005.pdf.

(Continued)

*Primary Examiner* — Kambiz Zand
*Assistant Examiner* — Abiy Getachew
(74) *Attorney, Agent, or Firm* — Hyperion Law, LLC; Cynthia M. Gilbert

(57) ABSTRACT

A method for distributing cryptographic data to authenticated recipients includes receiving, by an access control management system, from a first client device, information associated with an encrypted data object. The method includes receiving, by the access control management system, from a second client device, a request for the information associated with the encrypted data object. The method includes verifying, by the access control management system, that a user of the second client device is identified in the received information associated with the encrypted data object. The method includes authenticating, by the access control management system, with an identity provider, the user of the second client device. The method includes sending, by the access control management system, to the second client device, the received information associated with the encrypted data object.

19 Claims, 8 Drawing Sheets

(56) References Cited

OTHER PUBLICATIONS

Ravi Sandhu et al., "Peer-to-Peer Access Control Architecture using Trusted Computing Technology," ACM, SACMAT'05, Jun. 1-3, 2005, Stockholm, Sweden, 2005.

Erol Koc, et al., "PACISSO: P2P Access Control Incorporating Scalability and Self-Organization for Storage Systems," SMLI TR-2007-154, Sun Microsystems, Jun. 2007.

International Search Report and Written Opinion for PCT/US2011/068019, mailed Aug. 30, 2012, 9 pages.

* cited by examiner

METHODS AND SYSTEMS FOR DISTRIBUTING CRYPTOGRAPHIC DATA TO AUTHENTICATED RECIPIENTS

CROSS-REFERENCE TO RELATED APPLICATIONS

This application claims priority from U.S. Provisional Patent Application Ser. No. 61/432,181, filed on Jan. 12, 2011, entitled "Method of Decentralized, Dynamic Information Rights Management", which is hereby incorporated by reference.

BACKGROUND

The disclosure relates to distributing cryptographic data. More particularly, the methods and systems described herein relate to distributing cryptographic data to authenticated recipients.

Conventional systems for digital rights management are typically proprietary systems that provide functionality for securing—e.g., via one or more of encrypting, controlling access, and authenticating—shared data objects stored within the system and accessed by users of the system. However, such systems do not typically extend to securing data objects once the data objects are shared with individuals external to the system or for securing data objects created outside the system.

Although individuals may implement cryptographic functions without the use of a digital rights management system, such functions typically require a level of technical sophistication unavailable to the average individual. Further, even for sophisticated users, there are a number of well-known drawbacks to standard cryptographic techniques. For example, symmetric key cryptography (e.g., the Advanced Encryption Standard (AES) in the United States) allows for password-protection of data objects but does not prevent authorized users from sharing the password with unauthorized users and is reliant upon the strength of the password. As another example, asymmetric key cryptography (also referred to as public key cryptography) is an underlying, and well-known, technology for a number of security implementations; however, public key cryptography depends upon a user's ability to access the public key of any other user with whom she wishes to share a secured data object. Since maintaining a public key is not yet a mainstream activity, this approach is not an option for many individuals—even a technologically-sophisticated individual will not be able to implement this functionality if she wishes to share secured data objects with individuals who do not have public keys.

BRIEF SUMMARY

In one aspect, the methods and systems described herein provide functionality for distributing cryptographic data to authenticated recipients via secured or unsecured channels. In another aspect, a method for distributing cryptographic data to authenticated recipients includes receiving, by an access control management system, from a first client device, information associated with an encrypted data object. The method includes receiving, by the access control management system, from a second client device, a request for the information associated with the encrypted data object. The method includes verifying, by the access control management system, that a user of the second client device is identified in the received information associated with the encrypted data object. The method includes authenticating, by the access control management system, with an identity provider, the user of the second client device. The method includes sending, by the access control management system, to the second client device, the received information associated with the encrypted data object.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein relate to distributing cryptographic data to authenticated recipients. Before describing these methods and systems in detail, however, a description is provided of a network in which such methods and systems may be implemented.

Figure 1A:
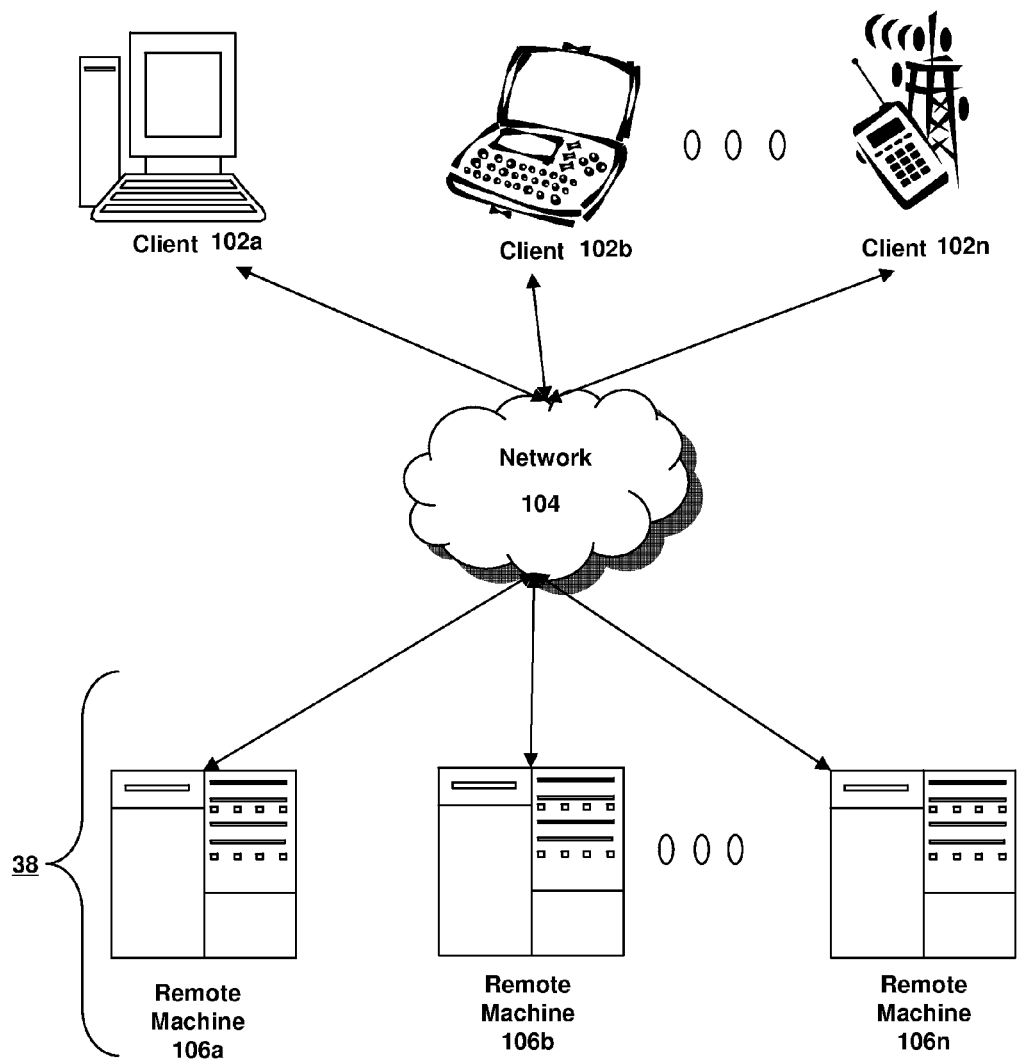
FIG. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, machine(s) 102, endpoint(s) 102, or endpoint node(s) 102) in communication with one or more remote machines 106a-106n (also generally referred to as server(s) 106, machine(s) 106, or computing device(s) 106) via one or more networks 104.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems, of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
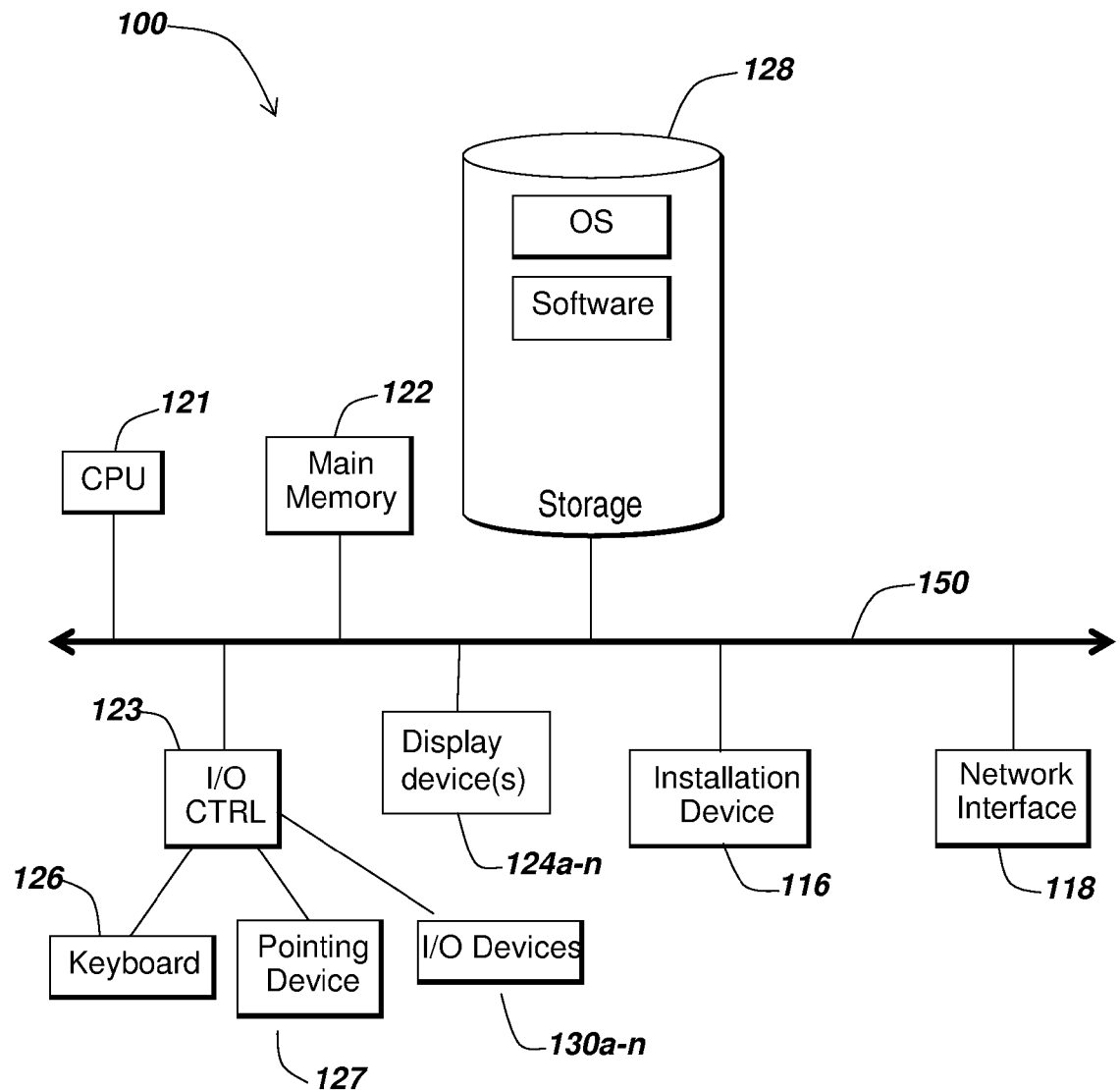
Figure 1C:
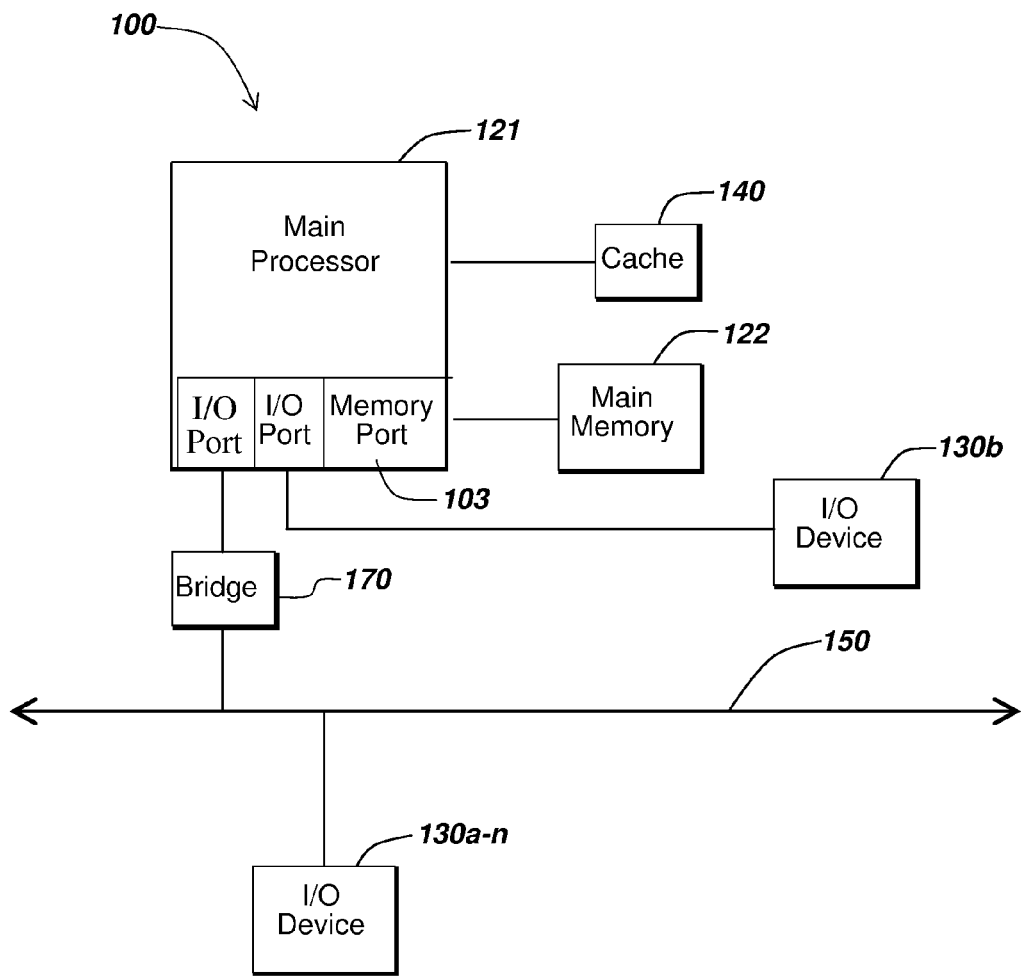

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPER-TRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7 and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; or any type and/or form of a Unix operating system.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd., of Seoul, Korea; Nokia of Finland; Hewlett-Packard Development Company, L.P. and/or Palm, Inc., of Sunnyvale, Calif., USA; Sony Ericsson Mobile Communications AB of Lund, Sweden; or Research In Motion Limited, of Waterloo, Ontario, Canada. In yet other embodiments, the computing device 100 is a smart phone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America, of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is device in the iPhone smartphone line of devices, manufactured by Apple Inc., of Cupertino, Calif. In still another of these embodiments, the computing device 100 is a device executing the Android open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the iPad line of devices, manufactured by Apple Inc.; the PlayBook, manufactured by Research in Motion; the Cruz line of devices, manufactured by Velocity Micro, Inc., of Richmond, Va.; the Folio and Thrive line of devices, manufactured by Toshiba America Information Systems, Inc., of Irvine, Calif.: the Galaxy line of devices, manufactured by Samsung; the HP Slate line of devices, manufactured by Hewlett-Packard; and the Streak line of devices, manufactured by Dell, Inc., of Round Rock, Tex.

In one embodiment, the methods and systems described herein provide functionality allowing a user to specify individuals who may access a data object regardless of whether the recipients are members of the same access control management system as the user, or of any access control management system at all. In another embodiment, the methods and systems described herein provide functionality allowing a user to distribute a secured data object via a non-secured channel and distribute the cryptographic data for accessing the secured data object via a separate, secure channel, where authentication, access control, and establishment of the secure channel is implemented by an access control management system; an authorized recipient can authenticate himself through a third-party identity provider, receive delivery of cryptographic data from the access control management system, and access the data object. In such an embodiment, the methods and systems described herein provide for the decoupling of access control and authentication from data storage and distribution.

Figure 2A:
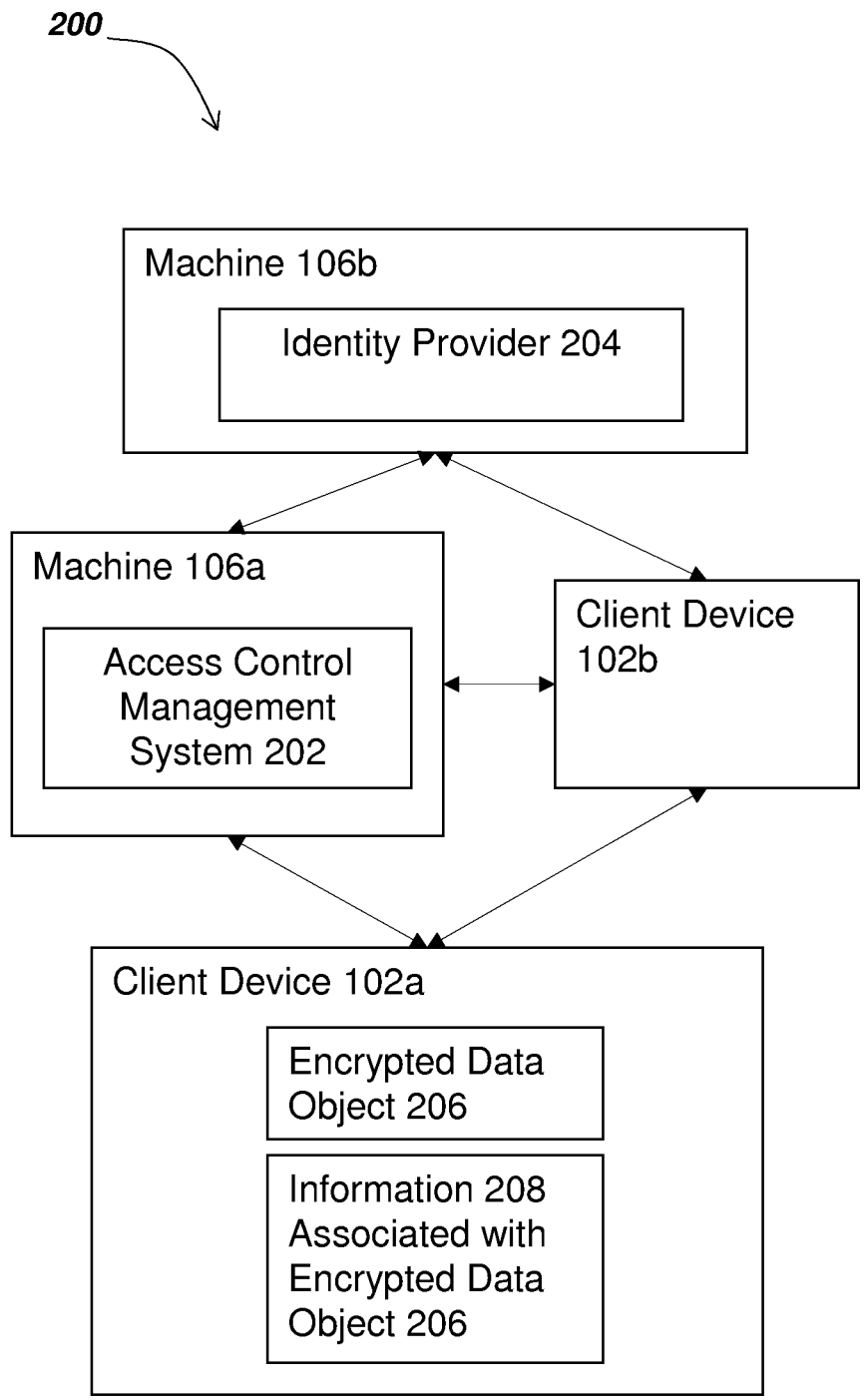
FIG. 2A is a block diagram depicting an embodiment of a system for distributing cryptographic data to authenticated recipients.

Referring now to FIG. 2A, a block diagram depicts one embodiment of a system for distributing cryptographic data to authenticated recipients. In brief overview, the system includes an access control management system 202, an identity provider 204, machines 106a-n, client devices 102a-n, an encrypted data object 206, and information 208 associated with the encrypted data object 206. In some embodiments, the client devices 102a-n are clients 102 as described above in connection with FIGS. 1A-C. In other embodiments, the access control management system 202 and the identity provider 204 execute on machine 106a-n. The machines 106a-n may be remote machines 106, as described above in connection with FIGS. 1A-C. In further embodiments, the machines 106 and client devices 102 exchange data via networks 104 as described above in connection with FIG. 1A-1C.

Figure 2B:
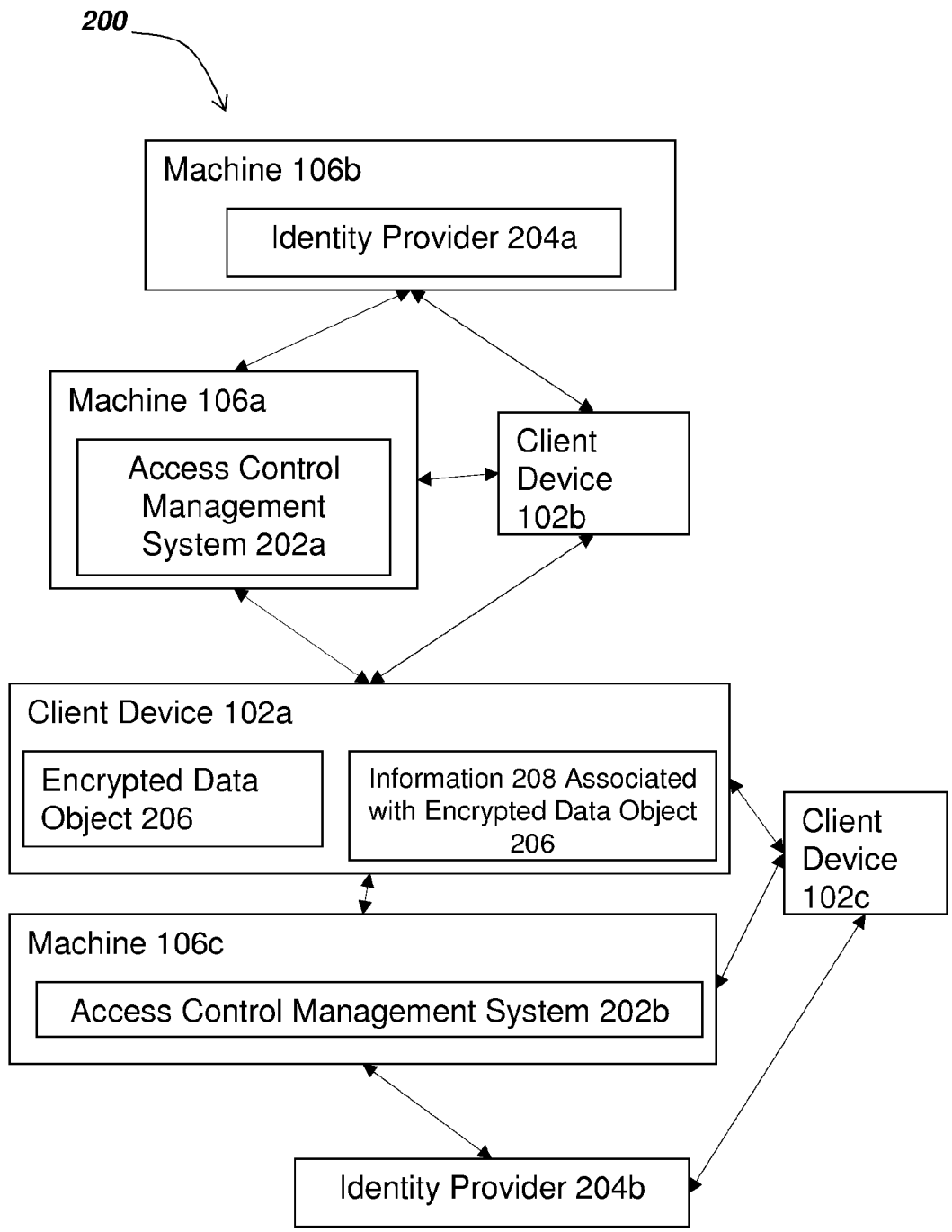
FIG. 2B is a block diagram depicting an embodiment of a system for distributing cryptographic data including a plurality of access control management systems.

Referring now to FIG. 2B, a block diagram depicts an embodiment of a system for distributing cryptographic data including a plurality of access control management systems. As shown in FIG. 2B, the system 200 from FIG. 2A includes a plurality of access control management systems 202a-n (referred to generally as access control management systems 202) and a plurality of identity providers 204a-n (referred to generally as identity providers 204). As described in greater detail below, in connection with FIG. 3, a user of a client device 102a may select the same or different access control management systems 202 for different recipients of the encrypted data object and each access control management system 202 may select the same or different identity providers 204 to authenticate different recipients.

Figure 2C:
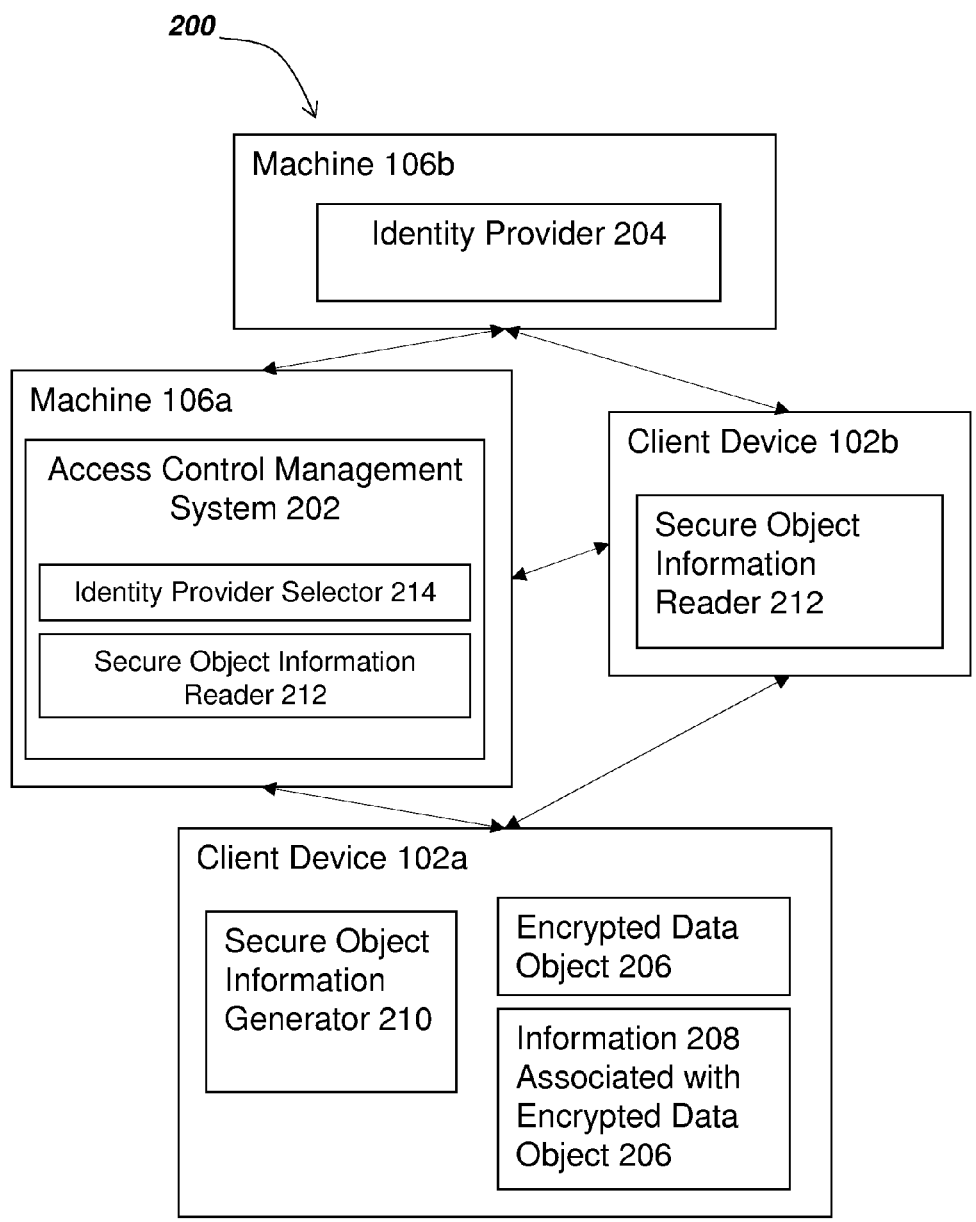
FIG. 2C is a block diagram depicting an embodiment of a system for distributing cryptographic data including an application for generating secure document information.

Referring now to FIG. 2C, a block diagram depicts an embodiment of a system 200 for distributing cryptographic data including a secure object information generator 210 and a secure object information reader 212. In one embodiment, the secure object information generator 210 is a software application executing on the client device 102a with which a user of the client device 102a may generate the information 208 associated with the encrypted data object 206; for example, and without limitation, the secure object information generator 210 may be provided as a stand-alone software application or as a plug-in or add-on to software executing on the client device 102a. In another embodiment, the user of the client device 102a executes the secure object information generator 210 to encrypt a document, thus generating the encrypted data object 206.

In one embodiment, a data object may be a document of any type, media file of any type, or other data object. In another embodiment, the data object is data in a format that natively supports encryption (e.g., PDF, compressed files, files generating using a word processing application such as, by way of example the MICROSOFT WORD application). In still another embodiment, the data object is data in a format that does not natively support encryption.

In one embodiment, the encrypted data object 206 includes a document in a self-describing format (e.g., an eXtended Markup Language (XML) format) that supports strong symmetric encryption, digital signatures via asymmetric encryption, unique identifiers, and data objects (e.g., documents, images multimedia, Portable Document Format (PDF) documents). In another embodiment, an encrypted data object 206 includes a unique identifier, a display name, and an identification of a type of the data object.

In some embodiments, the encrypted data object 206 includes an identifier of the access control management system 202. In one of these embodiments, the secure object information generator 210 includes the identifier (which may be provided, for example, and without limitation, as a uniform resource locator) and the computing device 102b uses the identifier to request the information 208 from the access control management system 202. In another of these embodiments, the identifier of the access control management system 202 is included in an unencrypted portion of the encrypted data object 206, such as an unencrypted header.

In some embodiments, the secure object information generator 210 includes functionality for encrypting data objects. In one of these embodiments, the secure object information generator 210 includes at least one encryption engine for encrypting or decrypting data objects. In other embodiments, the secure object information generator 210 generates an identifier for the encrypted data object 210 and includes the identifier in the information 208 that is transmitted to the access control management system 202. In other embodiments, the secure object information generator 210 requests that the access control management system 202 generate an identifier for the encrypted data object 206.

In one embodiment, the secure object information generator 210 processes a data object to generate an encrypted data object 206 and information 208 associated with the encrypted data object 206. The information 208 may be, for example, a registration payload containing information such as an encryption key used to encrypt the data object 206 and an access control list specifying users who may receive the encryption key to decrypt the data object 206. In one embodiment, the information 208 includes at least one identification of a user authorized to receive the encryption key; for example, the information 208 includes an email address for each authorized user.

In some embodiments, the information 208 includes an identifier of computing devices that are authorized to receive the information 208. For example, the user of the first computing device 102a may specify that a second user may receive the information 208 only at a specific machine (for example, prohibiting the second user from accessing the information 208 from a mobile device or public kiosk); alternatively, the user of the first computing device 102a may specify that any user of a particular machine may access the information 208 (for example, allowing all members of a department including a secured machine may access the information 208). In one of these embodiments, the information 208 includes an identification of an authorized machine that may be any machine 102 or 106 as described above in connection with FIGS. 1A-1C. In another of these embodiments, the information 208 includes an identification of an authorized machine that complies with the Trusted Platform Module Specification promulgated by the Trusted Computing Group of Beaverton, Oreg., USA. In still another of these embodiments, when authorizing a machine compliant with the Trusted Platform Module Specification as a recipient of the information 208, a user of the first computing device 102a may indicate that the access control management system 202 need not authenticate users of the authorized machine because the machine itself has certain properties that allows the user to trust that the machine has been secured.

In one embodiment, the information 208 includes an authorized user group instead of or in addition to authorizing a specific user; for example, the information 208 may specify a particular department, company, entity, or other plurality of users authorized to receive the information 208. In another embodiment, the information 208 includes an indication that an authorized user may delegate access; for example, a sending user may specify that a receiving user (such as a doctor) may delegate access to other users (such as a nurse, hospital administrator, resident, or other colleague) and the sending user may specify characteristics of authorized individuals to which the authorized user may delegate access (e.g., anyone with an email address ending in "@HypotheticalHospital.org").

In some embodiments, the information 208 includes a time-based restriction; for example, a user may specify that an identified second user may receive the information 208 within certain time periods (e.g., during a presentation, a consultation, a joint venture, and an arbitrary time frame). The information 208 may be generated separately from the encrypted data object 206 and transmitted separately from the encrypted data object 206.

In one embodiment, the information 208 includes a specification of data rights protection mechanisms to execute for the encrypted data object 206, including whether the encrypted data object 206 is permitted to be copied, pasted, forwarded by email or otherwise distributed to other unauthorized recipients, printed and/or screen-printed with or without embedding hidden "watermarks" in the data object for use in tracing information back to the application 210 or 212 that opened the data object 206, each of which are functions that the system is able to prohibit when the encrypted data object 206 is later opened by an authorized user. For example, the user of the first computing device 102a may prevent "print screen" in operating systems that otherwise support the print screen function; if the user wishes to prevent print screen, instructions to activate an existing digital rights management program including such countermeasures can be included in the information 208, in which case the countermeasure will be activated when an authorized recipient user decrypts the encrypted data object 206.

In some embodiments, the secure object information reader 212 allows a user to access information 208 generated by the secure object information generator 210. In some embodiments, and as will be described in greater detail below, the secure object information reader 212 includes functionality allowing a user to communicate with the access control management system 202 and the identity provider 204 to authenticate himself in order to receive information 208. In other embodiments, the secure object information generator 210 includes at least one encryption engine for encrypting or decrypting data objects. In further embodiments, the secure object information generator 210 and the secure object information reader 212 are provided as application plug-ins, web services, or stand-alone applications.

The access control management system 202 enables access control using decentralized identity management, relying on external identity providers to authenticate user identity. In one embodiment, the access control management system 202 includes functionality for accessing information 208 generated by a secure object information generator 210. For example, the access control management system 202 may include a secure object information reader 212 that receives and processes the information 208.

In one embodiment, the access control management system 202 includes an identity provider selector 214 identifying a plurality of identity providers 204 and selecting one of the plurality of identity providers 204 for authentication of a user of a client device 102b. For example, the identity provider selector 214 may receive an enumeration of user identifiers from the secure object information reader 212 and analyze each enumerated user identifier in the enumeration to determine which identity providers 204 to access for authentication of each enumerated user identifier; for instance, by analyzing a domain name included in the user identifier and querying a database to identify an identity provider 204 associated with the analyzed domain name. In another embodiment, the access control management system 202 uses an interface to the identity provider 204 through which the access control management system 202 may make authentication requests. For example, the access control management system 202 may establish an interface to an identity provider 204 that provides an interface according to a federated identity standard such as OpenID, Information Card (InfoCard), or SAML standards. In still another embodiment, the access control management system 202 includes functionality for communicating with identity providers using different communications standards.

The access control management system 202 includes functionality for verifying that the user of the second client device 102b is identified in the received information associated with the encrypted data object. For example, the access control management system 202 may include functionality for analyzing the received information 208 to determine whether the information 208 includes an identifier of the user. As another example, the access control management system 202 may include functionality for analyzing an access control list included in the received information 208 to determine whether the user is on the access control list.

In some embodiments, the access control management system 202 supports Role-Based Access Control (RBAC). RBAC is an existing access control framework in which access to files is controlled by virtue of the roles a user has been assigned rather than the user's personal identity. In some embodiments, the access control management system 202, the information 208 includes identified properties or roles, and the access control management system 202 makes an access control decision based on whether a user has an authorized property or role.

In some embodiments, the access control management system 202 includes a transaction log in which it stores an identification of at least one of: transactions, users, groups, roles, information 208 associated with each user, policies and business rules. In one of these embodiments, the access control management system 202 issues unique identifiers for data objects, transmitting the unique identifier to the secure object information generator 210 that generates the information 208. By tracking access requests, both valid and invalid, usage statistics can be gathered about who is accessing data and for how long, as well as from where unauthorized access attempts are being made. This capability can enable data owners or stewards to understand what data objects are useful, as well as who they may want to add or remove from their access control lists.

Figure 3:
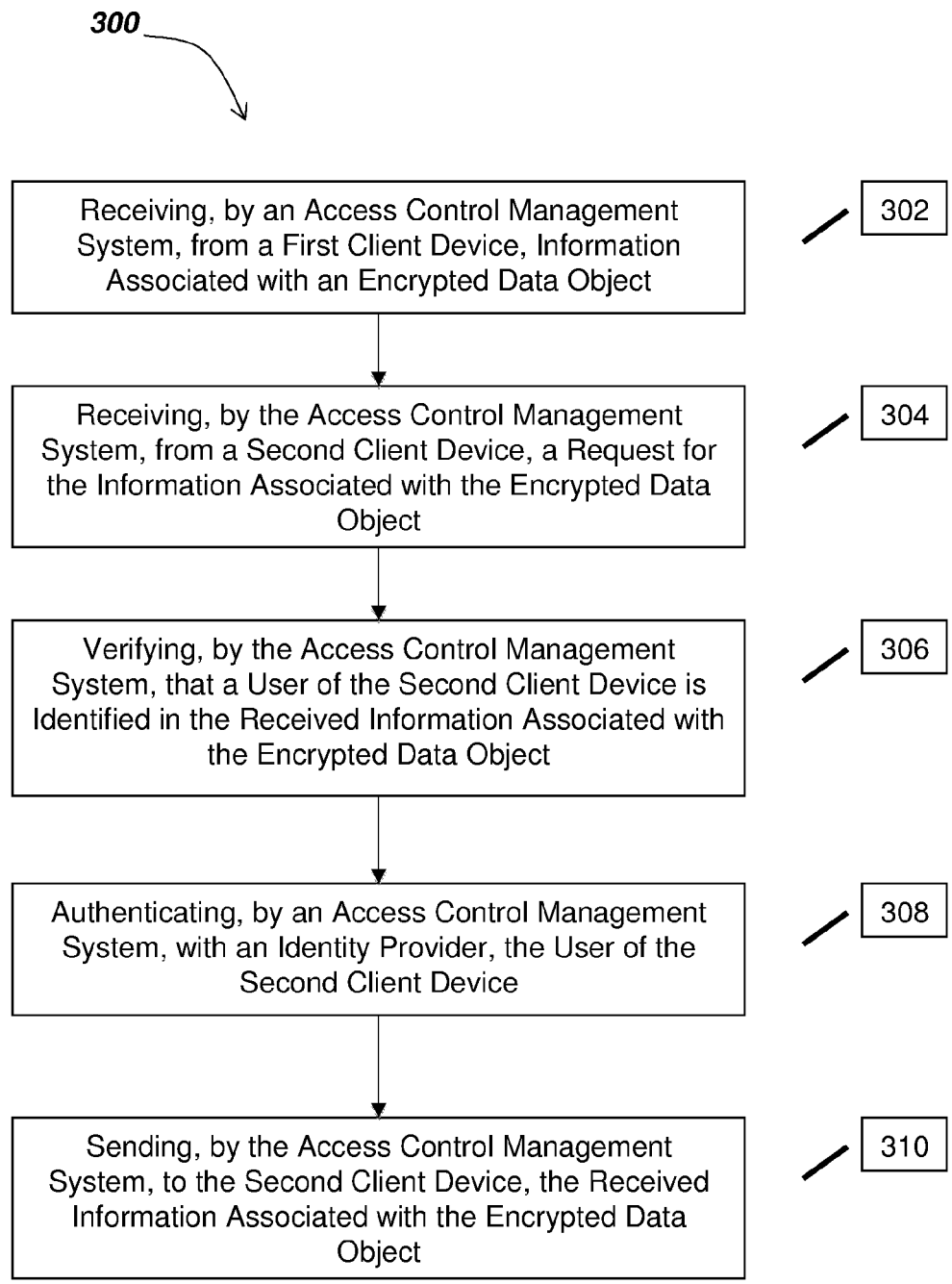
FIG. 3 is a flow diagram depicting an embodiment of a method for distributing cryptographic data to authenticated recipients.

Referring now to FIG. 3, a flow diagram depicts one embodiment of a method 300 for distributing cryptographic data to authenticated recipients. In brief overview, the method 300 includes receiving, by an access control management system, from a first client device, information associated with an encrypted data object (302). The method 300 includes receiving, by the access control management system, from a second client device, a request for the information associated with the encrypted data object (304). The method 300 includes verifying, by the access control management system, that a user of the second client device is identified in the received information associated with the encrypted data object (306). The method 300 includes authenticating, by the access control management system, with an identity provider, the user of the second client device (308). The method 300 includes sending, by the access control management system, to the second client device, the received information associated with the encrypted data object (310).

Referring now to FIG. 3 in greater detail, and in connection with FIGS. 2A-2C, the access control management system receives, from a first client device, information associated with an encrypted data object (302). In one embodiment, before sending the information 208 to the access control management system 202, a user of the first client device 102 executes the secure object information generator 210 to encrypt the data object 206 and generate the information 208.

In one embodiment, the secure object information generator 210 generates the information 208 based upon information provided by the user of the first client device 102a. In another embodiment, the information 208 includes an identifier of the data object 206, cryptographic data associated with the encrypted data object 206 (e.g., a key for decrypting the encrypted data object 206), and an identification of each individual authorized to receive the cryptographic data. In still another embodiment, the information 208 includes an identifier of the data object 206 and cryptographic data associated with the encrypted data object 206 (e.g., a key for decrypting the encrypted data object 206). In such an embodiment, the user of the first client device 102a may provide the identification of each individual authorized to receive the cryptographic data separately from the information 208. In some embodiments, the secure object information generator 210 includes an encryption engine used to generate the cryptographic data. In other embodiments, the secure object information generator 210 executes an encryption engine on the computing device 102a, which generates the cryptographic data.

In some embodiments, the access control management system 202 receives the information 208 from the first client device 102a via an interface between the secure object information generator 210 executing on the first client device 102a and the secure object information reader 212 executing on the access control management system 202. In one of these embodiments, for example, the secure object information generator 210 executing on the first client device 102a and the secure object information reader 212 use Secure Socket Layers (SSL) or Transport Layer Security (TLS) to communicate. In other embodiments, the access control management system 202 and the first client device 102a establish a secure connection for transmission of the information 208 independently of the secure object information generator 210 and the secure object information reader 212.

In some embodiments, the access control management system 202 receives an indication that the first client device 102a selected the access control management system 202 from a plurality of access control management systems 202a-n for storage of the information 208 associated with the encrypted data object 206. In one of these embodiments, the access control management system 202 receives the indication from the first client device 102a.

In some embodiments, the access control management system 202 authenticates a user of the first client device 102a.

For example, the access control management system 202 may authenticate the user of the first client device 102a upon receiving a notification that the first client device 102a selected the access control management system 202 from a plurality of access control management systems 202a-n for storage of the information 208 associated with the encrypted data object 206. In one of these embodiments, the access control management system 202 authenticates the user of the first client device 102a with the identity provider 204. In another of these embodiments, the access control management system 202 identifies a second identity provider 204b to authenticate the user of the first client device 102a. In another of these embodiments, the access control management system 202 uses an interface provided by the secure object information reader 212 to communicate with the secure object information generator 210 executing on the first client device 102a via an interface and authenticates the user of the first client device 102a via the interface. For example, the access control management system 202 may use Secure Socket Layers (SSL) or Transport Layer Security (TLS) to communicate with the first client device 102a.

In one embodiment, the access control management system 202 and the first client device 102a exchange a shared secret key. In another embodiment, the first client device 102a encrypts the information 208 associated with the encrypted data object 206 with the shared secret key. In still another embodiment, the first client device 102a transmits the encrypted information 208 to the access control management system 202. In some embodiments, the secure object information generator 210 executing on the first client device 102a includes a public key associated with the access control management system 202 with which the first client device 102a may establish a secure connection to the access control management system 202. In other embodiments, the access control management system 202 establishes a secure communication channel with the first client device 102a through the use of well-established key exchange protocols.

In one embodiment, the access control management system 202 receives information 208 including an access control list associated with the encrypted data object 206. In another embodiment, the access control management system 202 receives information 208 including a cryptographic key for use in decrypting the encrypted data object. In still another embodiment, the access control management system 202 stores the received information 208.

In some embodiments, the access control management system 202 receives information including a user identifier associated with the user of the second client device 102b. In one of these embodiments, the access control management system 202 selects the identity provider 204a with which to authenticate the user of the second client device 102b from a plurality of identity providers 204a-n, based on the received user identifier.

In one embodiment, the access control management system 202 provides an interface with the user of the first client device 102a can modify the information 208 stored by the access control management system 202. In another embodiment, the user of the first client device 102a generates a modified version of the information 208 and transmits the modified version to the access control management system 202. In some embodiments, the ability to modify an existing enumeration of authorized users within the information 208 allows users to add or revoke access quickly—such as when employees are being hired or fired or consultants are provided with short-term access to secure data.

In one embodiment, the access control management system 202 stores the received information 208 in a database. In some embodiments, the database is an ODBC-compliant database. For example, the database may be provided as an ORACLE database, manufactured by Oracle Corporation of Redwood Shores, Calif. In other embodiments, the database can be a Microsoft ACCESS database or a Microsoft SQL server database, manufactured by Microsoft Corporation of Redmond, Wash. In still other embodiments, the database may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., and Cassandra databases distributed by The Apache Software Foundation of Forest Hill, Md. In further embodiments, the database may be any form or type of database.

The access control management system receives, from a second client device, a request for the information associated with the encrypted data object (304). In one embodiment, the second client device 102b transmits the request to the access control management system 202 after receiving an instruction from the first client device 102a to transmit the request. In one embodiment, the first client device 102a transmits the encrypted data object to the second client device 102b. A user of the first client device 102a may send an instruction to the user of the second client device 102b, for example, and without limitation, via electronic communication such as an electronic mail message (e.g., "email") or message sent via a short message service protocol (e.g., "text message"). For example, the user of the first client device 102a may send a message to the user of the second client device 102b including the encrypted data object and an instruction to retrieve cryptographic data for decrypting the document from the access control management system 202 (e.g., by including a uniform resource locator (URL) in the message to provide a link to the access control management system 202). As another example, when the user of the second client device 102b attempts to access the encrypted data object 206, the user is instructed to execute the secure object information reader 212, which may automatically begin the process of establishing authenticating the user to and establishing a secure connection with the access control management system 202. In some embodiments, the user of the second client device 102b includes an identifier of the identity provider 204 with the request for the information 208.

In some embodiments, the user of the second client device 102b is not required to have an account or a previous relationship of any kind with the access control management system 202; the relationship the user of the second client device 102 has with an identity provider 204 suffices to authenticate the user, as described in further detail below. In one embodiment, where the user of the second client device 102b lacks a relationship with both the access control management system 202 and the identity provider 204, the access control management system 202 transmits to the second client device 102b a message (e.g., an email message) containing a secured link to the access control management system 202 and allow the user of the second client device 102b to establish an account. However, many common providers of consumer email accounts also act as identity providers (e.g., popular providers such as Google, Inc., of Mountain View, Calif., USA, and AOL, Inc., of Dulles, Va., USA, implement the OpenID standard and thus are also identity providers 204).

The access control management system verifies that a user of the second client device is identified in the received information associated with the encrypted data object (306). In one embodiment, the received information 208 includes an access control list identifying users to which the access control management system 202 may forward the information 208.

In some embodiments, the access control management system 202 includes distributed functionality for verifying that the user of the second client device 102b is identified in the received information 208. In one of these embodiments, the functionality provided by the access control management system 202 is distributed across a plurality of machines 106. For example, and without limitation, the access control management system 202 may perform a role-based evaluation of the user of the second client device 102b; for instance, the access control management system 202 may execute a first component for verifying that the user of the second client device 102b is identified in the received information 208 and may execute a second component for verifying that a role associated with the user is a role identified in the information 208. By way of example, the information 208 may specify that cardiologists at a particular hospital may receive a subset of the information 208 (e.g., the cryptographic key) and the user of the second client device 102b may indicate he is a doctor at the particular hospital; the first component may verify that the hospital is listed in the information 208 and the second component may verify that the doctor is a cardiologist at the hospital. In such an embodiment, the first component and the second component may be executed on the same or different machines. For example, the first component may execute on the machine 106a with the access control management system 202 while the second component executes on a machine 106c located at the hospital and in communication with the machine 106a. In another example, the access control management system 202 executing on the machine 106a includes the functionality of both the first component and the second component. In some embodiments, the access control management system 202 includes a policy information point. In other embodiments, the access control management system 202 includes a policy decision point. In further embodiments, the access control management system 202, the first component and the second component may execute functionality for evaluating and enforcing policies.

The access control management system authenticates, with an identity provider, the user of the second client device (308). In embodiments such as those depicted in FIG. 2B, the system 200 may include a plurality of identity providers 204 from which the access control management system 202 identifies an identity provider 204 that can authenticate the user of the second client device 102b. In one embodiment, the access control management system 202 determines that the identity provider 204 stores authentication information for the user of the second client device 102b, based on a user identifier. For example, the information 208 may include the user identifier.

In one embodiment, the access control management system 202 sends a request to the identity provider 204 to authenticate the user of the second client device 102b; the identity provider 204 then communicates with the second client device 102b to authenticate the user. For example, the identity provider 204 may request that the user of the second client device 102b transmit a username and password to the identity provider 204 to complete the authentication process. The identity provider 204 may use any method for authenticating the user; by way of example, and without limitation, the identity provider 204 may implement authentication techniques relying on biometrics, hardware tokens, one-time password fobs, and smart-phone codes, as well as authentication techniques based on identities of the client devices.

In one embodiment, as discussed above, the access control management system 202 retrieves a user identifier (such as an email address) from the information 208 and identifies the identity provider 204 that can authenticate the user of the second client device 102b based on the user identifier. In one example of such an embodiment, the access control management system 202 uses a domain name within the user identifier (e.g., the portion of an email address located after the @ symbol) to look up the identity provider 204. In another example of such an embodiment, the access control management system 202 accesses a database to look up the identity provider 204 (e.g., a database hosted by the access control management system 202 or by a third party). In such an embodiment, the access control management system 202 receives personally identifiable information (e.g., the email address) of the user of the second client device 102b before authentication of the user. In another embodiment, the user of the second client device 102b provides the access control management system 202 with an identifier of the identity provider 204; for example, the identifier may be a uniform resource locator (URL) that directs the access control management system 202 to the identity provider 204 for initiating the authentication process. In one example of such an embodiment, the access control management system 202 does not receive personally identifiable information of the user of the second client device 102b (e.g., an email address) until after the authentication process is complete. In another embodiment, the user of the second client device 102b provides the access control management system 202 with a URL (e.g., a fully qualified OpenID URL) that directs the access control management system 202 to a resource hosted by the identity provider 204 that can be used by the access control management system 202 to initiate the authentication process. In one example of such an embodiment, discovery of the identity provider 204 is not required since the identity provider 204 is explicitly identified in the URL. In another example of such an embodiment, the user of the second client device 102b provides personally identifiable information to the access control management system 202 (e.g., the URL or a portion thereof).

In some embodiments, if an individual other than the intended user accesses the user's client device 102, opens the secure object information generator 210 or the secure object information reader 212 and tries to open a data object 206, that individual will need to know the user's identifying information as maintained by the identity provider 204 (e.g., the user's email password), or fulfill other authentication criteria, in order to receive authentication. In this manner, protection is provided against hackers or thieves gaining access to protected files.

In some embodiments, incorporating the methods and systems described herein adds an additional layer of protection by separating the locations at which the following reside: (1) the encrypted data object 206, (2) the information 208, and (3) the authentication information with which the user of the second client device 102b authenticates himself to the identity provider 204; for example, neither the encrypted data object 206 nor the authentication information reside on the access control management system 202.

The access control management system sends, to the second client device, the received information associated with the encrypted data object (310). In one embodiment, the access control management system 202 establishes a secure connection to the second client device 102b upon authentication of the user of the second client device 102b. In some embodiments, the secure object information reader 212 executing on the second client device 102b includes a public key associated with the access control management system 202 with which the second client device 102b may establish a secure connection to the access control management system 202. In other embodiments, the access control management system 202 establishes a secure communication channel with the second client device 102b through the use of well-established key exchange protocols. In further embodiments, the second client device 102b sends an identification of the encrypted data object 206 to the access control management system 202 with the request for the information 208 over the established communications channel.

In some embodiments, the access control management system 202 sends all of the received information 208 to the second client device 102b. In other embodiments, the access control management system 202 sends a subset of the received information 208 to the second client device 102b. For example, where the received information 208 includes an access control list and a cryptographic key, the access control management system 202 may send just the cryptographic key to the second client device 102b, or the access control management system 202 may send both the access control list and the cryptographic key. In one embodiment, the second client device 102b decrypts the encrypted data object 206 with a cryptographic key included in the received information 208 associated with the encrypted data object 206. In some embodiments, the cryptographic key is not accessed by the user of the second client device 102b but delivered to trusted services and applications in memory 122. In one of these embodiments, the cryptographic key is not stored in storage 128 of the second client device 102b, to prevent the user of the second client device 102b from accessing the cryptographic key directly. In other embodiments, cryptographic keys are delivered in a persistent ticket (much like a web cookie). In this way, users have the ability to decrypt an encrypted data object 206 for viewing even if there is no network access to the access control management system 202. In one of these embodiments, a locally available authentication mechanism is used that can also protect the ticket residing in storage 128; such a mechanism might be provided by a secure PKI hardware token that the user uses to authenticate directly to the client device 102, or at least to unlock the ticket.

In some embodiments, the access control management system 202 uses the same identity provider 204 for authenticating each user who requests access to the information 208. In other embodiments, the access control management system 202 uses different identity providers 204 to authenticate different users. In one of these embodiments, the access control management system 202 selects a first identity provider 204a to authenticate a user of the second client device 102b. In another of these embodiments, the access control management system 202 receives, from a third client device 102c, a request for the information 208 associated with the encrypted data object 206. In still another of these embodiments, the access control management system 202 verifies that a user of the third client device 102c is identified in the received information associated with the encrypted data object. In another of these embodiments, the access control management system 202 authenticates the user of the third client device 102c with a second identity provider 204b. In yet another of these embodiments, the access control management system 202 sends the received information 208 associated with the encrypted data object 206 to the authenticated user of the third client device 102c.

Referring still to FIG. 3, and in connection with FIGS. 2A-2C, the system 200 may include a plurality of access control management systems 202a-n. In some embodiments, the user of the first client device 102a selects different access control management systems 202 for different recipients of the encrypted data object 206. In one of these embodiments, a second access control management system 202b receives, from the first client device 102a, information 208 associated with the encrypted data object 206. In another of these embodiments, the second access control management system 202b receives, from a third client device 102c, a request for the information 208 associated with the encrypted data object 206. In still another of these embodiments, the second access control management system 202b verifies that a user of the third client device 102c is identified in the received information 208 associated with the encrypted data object 206; for example, the second access control management system 202b may verify that the user of the third client device 102 is identified in the received information 208 as described above in connection with FIG. 3 (306). In another of these embodiments, the second access control management system 202b authenticates the user of the third client device 102c; for example, the second access control management system 202b may authenticate the user of the third client device 102 as described above in connection with FIG. 3 (308). In one embodiment, the second access control management system 202b authenticates the user of the third client device 102c with the identity provider 204. In another embodiment, the second access control management system 202b authenticates the user of the third client device 102c with a second identity provider 204b. In yet another of these embodiments, the second access control management system 202b sends, to the third client device 102c, the received information 208 associated with the encrypted data object 206; for example, the second access control management system 202b may authenticate the user of the third client device 102 as described above in connection with FIG. 3 (310).

Figure 4:
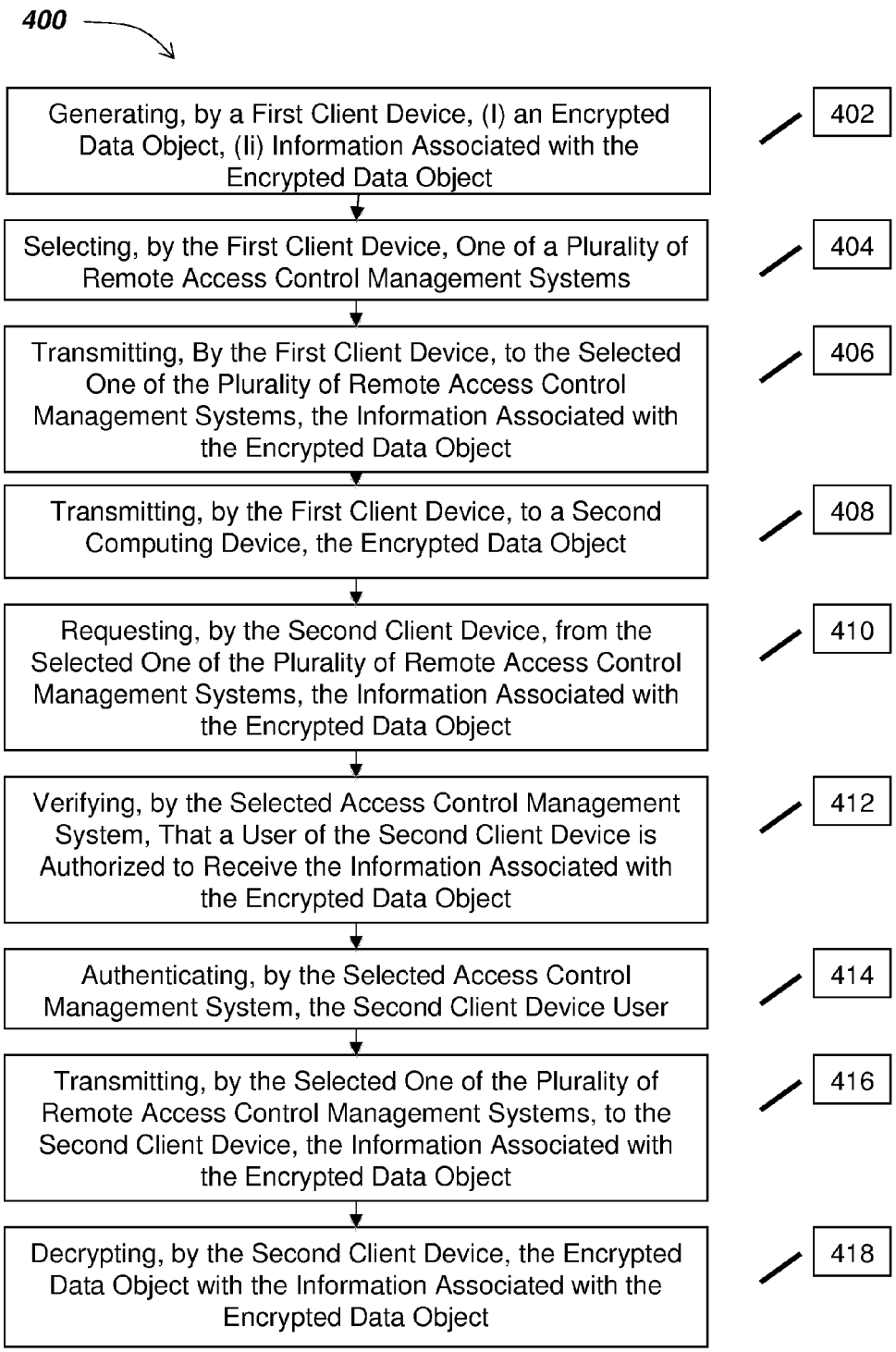
FIG. 4 is a flow diagram depicting another embodiment of a method for distributing cryptographic data to authenticated recipients.

Referring now to FIG. 4, a flow diagram depicts one embodiment of a method 400 for distributing cryptographic data to authenticated recipients. The method 400 includes generating, by a first client device, (i) an encrypted data object and (ii) information associated with the encrypted data object (402). The method 400 includes selecting, by the first client device, one of a plurality of remote access control management systems (404). The method 400 includes transmitting, by the first client device, to the selected one of the plurality of remote access control management systems, the information associated with the encrypted data object (406). The method 400 includes transmitting, by the first client device, to a second client device, the encrypted data object (408). The method 400 includes requesting, by the second client device, from the selected one of the plurality of remote access control management systems, the information associated with the encrypted data object (410). The method 400 includes verifying, by the selected one of the plurality of remote access control management systems, that a user of the second client device is authorized to receive the information associated with the encrypted data object (412). The method 400 includes authenticating the user of the second client device (414) The method 400 includes transmitting, by the selected one of the plurality of remote access control management systems, to the second client device, the information associated with the encrypted data object (416). The method 400 includes decrypting, by the second client device, the encrypted data object with the information associated with the encrypted data object (418).

Referring now to FIG. 4, and in connection with FIGS. 2A-2C and 3, the first client device 102a generates (i) an encrypted data object 206 and (ii) information 208 associated with the encrypted data object 206 (402). In one embodiment, a user of the first client device 102a executes the secure object information generator 210 to encrypt a data object, generating the encrypted data object 206, and to generate the information 208 associated with the encrypted data object 206. In some embodiments, the secure object information generator 210 provides an interface with which a user of the first client device 102a may specify approved recipients of the information 208; for example, the secure object information generator 210 may provide a graphical user interface into which the user may type the email addresses or other identifying information for each approved recipient.

The first client device 102a selects one of a plurality of remote access control management systems 202 (404). In some embodiments, the secure object information generator 210 executing on the first client device 102a stores an identification of available access control management systems 202. In one of these embodiments, the user of the first client device 102a identifies an access control management system 202 for use. In another of these embodiments, the user of the first client device 102a may customize the identification of available access control management systems 202 (e.g., by adding, removing, or otherwise modifying the access control management systems 202 included in the identification). In other embodiments, an access control management system 202 provides an identification with which the user of the first client device 102a may customize the identification of available access control management systems 202 (e.g., by publishing a uniform resource locator).

The first client device 102a transmits, to the selected one of the plurality of remote access control management systems 202, the information 208 associated with the encrypted data object 206 (406). In one embodiment, the secure object information generator 210 transmits the information 208 to the selected access control management system 202. In another embodiment, the access control management system 202 receives the information 208 as described above in connection with FIG. 3 (302).

The first client device 102a transmits, to a second client device 102b, the encrypted data object 206 (408). The user of the first computing device 102a may distribute the encrypted data object 206 by any method including, by way of example and without limitation, attaching it to emails, sending it to a "cloud-based" service (e.g., storing the encrypted data object 206 with a third-party service for sharing and storing files), and posting it on a website. In some embodiments, existing email systems are used to email the encrypted data object 206 as an attachment to an email. In one of these embodiments, an email system is used to send an email with the encrypted data object 206 when the email system supporting the encrypted data object 206 as a valid email body type; for example, existing email systems may be modified to recognize the email body type via an update or an extension, such as an add-on or plug-in functionality.

The second client device 102b requests, from the selected one of the plurality of remote access control management systems 202, the information associated with the encrypted data object 206 (410). In one embodiment, the access control management system 202 receives the request as described above in connection with FIG. 3 (304).

The selected one of the plurality of remote access control management systems 202 verifies that a user of the second client device 102b is authorized to receive the information 208 associated with the encrypted data object 206 (412). In one embodiment, the access control management system 202 verifies the user as described above in connection with FIG. 3 (306).

The selected one of the plurality of remote access control management systems 202 authenticates the user of the second client device 102b (414). In one embodiment, the access control management system 202 authenticates the user as described above in connection with FIG. 3 (308).

The selected one of the plurality of remote access control management systems 202 transmits, to the second client device 102b, the information associated with the encrypted data object 206 (416). In one embodiment, the access control management system 202 sends the information 208 as described above in connection with FIG. 3 (310).

The second client device 102b decrypts the encrypted data object 206 with the information 208 associated with the encrypted data object 206 (416). In one embodiment, the secure object information reader 212 executing on the second client device 102b decrypts the encrypted data object 206.

In some embodiments, the first client device 102a selects a second of the plurality of remote access control management systems 202 and transmits the information 208 associated with the encrypted data object 206 to the selected second of the plurality of remote access control management systems 202. In one of these embodiments, the first client device 102a transmits the encrypted data object 206 to a third client device 102c. In another of these embodiments, the third client device 102c requests, from the selected second access control management system 202b, the information 208 associated with the encrypted data object 206. In still another of these embodiments, the selected second access control management system 202 verifies that a user of the third client device 102c is authorized to receive the information 208 associated with the encrypted data object 206 and authenticates the user. In still another of these embodiments, the selected second access control management system 202b transmits, to the third client device 102c, the information 208 associated with the encrypted data object 206. The third client device 102c decrypts the encrypted data object 206 with the information 208 associated with the encrypted data object 206.

In some embodiments, the methods and systems described herein provide functionality for electronic file protection. In one embodiment, implementation of the methods and systems described herein provides functionality for coupling an access control management system with an identity provider, improving the ability of the access control management system to authenticate individuals requesting access to cryptographic data. In another embodiment, implementation of the methods and systems described herein provides functionality for decoupling an access control management system from a storage system, reducing a storage burden on the access control management system and increasing the flexibility the system provides to users who benefit from a decentralized storage system. In still another embodiment, implementation of the methods and systems described herein provides functionality for users to share encrypted data objects with individuals who do not have a pre-existing trust relationship with an access control management system or who have a pre-existing trust relationship with an access control management system other than the one used by the distributing user. In yet another embodiment, implementation of the methods and systems described herein provides functionality for creating secure data objects with access rights that are managed by an access control management system while authentication services are provided by a third-party identity provider. In some embodiments, implementations of the methods and systems described herein allow consumers to exchange data securely using means with which typical computer users are familiar (i.e., email addresses and account passwords) to control (with a high degree of assurance and flexibility) access to the exchanged data.

It should be understood that the systems described above may provide multiple ones of any or each of those components and these components may be provided on either a standalone machine or, in some embodiments, on multiple machines in a distributed system. The phrases in one embodiment', in another embodiment', and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for distributing cryptographic data to authenticated recipients, it will now become apparent to one of skill in the art that other embodiments incorporating the concepts of the disclosure may be used. Therefore, the disclosure should not be limited to certain embodiments, but rather should be limited only by the spirit and scope of the following claims.

The invention claimed is:

1. A method comprising:
receiving, by an access control management system, from a first client device, information associated with an encrypted data object;
receiving, by the access control management system, from a second client device, a request for the information associated with the encrypted data object;
verifying, by the access control management system, that a user of the second client device is identified in the received information associated with the encrypted data object;
automatically selecting, by the access control management system, an identity provider from a plurality of identity providers, based on a user identifier included in the received information associated with the encrypted data object, the user identifier associated with the user of the second client device;
automatically requesting, by the access control management system, from the selected identity provider, authentication of the user of the second client device; and
sending, by the access control management system, to the second client device, the received information associated with the encrypted data object, responsive to the authentication by the selected identity provider of the user of the second client device;
receiving, by an access control management system, from the first client device, information associated with a second encrypted data object;
receiving, by the access control management system, from a third client device, a request for the information associated with the second encrypted data object;
verifying, by the access control management system, that a user of the third client device is identified in the received information associated with the second encrypted data object;
automatically selecting, by the access control management system, a second identity provider from the plurality of identity providers, based on a second user identifier included in the received information associated with the encrypted data object, the second user identifier associated with the user of the third client device;
automatically requesting, by the access control management system, from the selected second identity provider, authentication of the user of the third client device; and
sending, to the third client device, the received information associated with the second encrypted data object, responsive to the authentication of the user of the second client device by the second identity provider.

2. The method of claim 1 further comprising receiving, by the access control management system, an indication that the first client device selected the access control management system from a plurality of access control management systems for storage of the information associated with the encrypted data object.

3. The method of claim 1, further comprising:
receiving, by a second access control management system, from the first client device, information associated with the encrypted data object;
receiving, by the second access control management system, from a third fourth client device, a request for the information associated with the encrypted data object;
verifying, by the second access control management system, that a user of the third fourth client device is identified in the received information associated with the encrypted data object;
automatically requesting, by the second access control management system, from the selected identity provider, authentication of the user of the third fourth client device; and
sending, by the second access control management system, to the third fourth client device, the received information associated with the encrypted data object, responsive to the authentication of the user of the third fourth client device by the selected identity provider.

4. The method of claim 3, wherein requesting comprises requesting, by the second access control management system, from a second identity provider, authentication of the user of the third client device.

5. The method of claim 1, wherein receiving information associated with an encrypted data object further comprises receiving an access control list associated with the encrypted data object.

6. The method of claim 1, wherein receiving information associated with an encrypted data object further comprises receiving information including a cryptographic key for use in decrypting the encrypted data object.

7. The method of claim 1, wherein receiving information associated with an encrypted data object further comprises receiving information including a user identifier associated with the user of the second client device.

8. The method of claim 1, wherein selecting an identity provider further comprises determining, by the access control management system, prior to authentication that the selected identity provider stores authentication information for the user of the second client device, based on a received user identifier.

9. The method of claim 1, wherein receiving the request further comprises receiving, by the access control management system, an identifier associated with the selected identity provider.

10. The method of claim 1 further comprising requesting, by the access control management system, from a second identity provider, authentication of a user of the first client device.

11. The method of claim 1 further comprising exchanging, by the access control management system and the first client device, a shared secret key.

12. The method of claim 11 further comprising encrypting, by the first client device, the information associated with the encrypted data object with the shared secret key.

13. The method of claim 12 further comprising transmitting the encrypted information to the access control management system.

14. The method of claim 1 further comprising transmitting, by the first client device, to the second client device, the encrypted data object.

15. The method of claim 14 further comprising transmitting, by the first client device, to the second client device, an identifier of the access control management system.

16. The method of claim 1 further comprising storing, by the access control management system, the received information relating to the encrypted data object.

17. The method of claim 1 further comprising decrypting, by the second client device, the encrypted data object with a cryptographic key included in the received information associated with the encrypted data object.

18. A non-transitory computer readable medium having instructions thereon that when executed provide a method, the computer readable medium comprising:
- instructions to receive, by an access control management system, from a first client device, information associated with an encrypted data object;
- instructions to receive, by the access control management system, from a second client device, a request for the information associated with the encrypted data object;
- instructions to verify, by the access control management system, that a user of the second client device is identified in the received information associated with the encrypted data object;
- instructions to automatically select, by the access control management system, an identity provider from a plurality of identity providers, based on a user identifier included in the received information associated with the encrypted data object, the user identifier associated with the user of the second client device;
- instructions to automatically request, by the access control management system, from the selected identity provider, authentication of the user of the second client device; and
- instructions to send, to the second client device, the received information associated with the encrypted data object, responsive to the authentication by the selected identity provider of the user of the second client device;
- instructions to receive, by an access control management system, from the first client device, information associated with a second encrypted data object;
- instructions to receive, by the access control management system, from a third client device, a request for the information associated with the second encrypted data object;
- instructions to verify, by the access control management system, that a user of the third client device is identified in the received information associated with the second encrypted data object;
- instructions to automatically select, by the access control management system, a second identity provider from the plurality of identity providers, based on a second user identifier included in the received information associated with the encrypted data object, the second user identifier associated with the user of the third client device;
- instructions to automatically request, by the access control management system, from the selected second identity provider, authentication of the user of the third client device; and
- instructions to send, to the third client device, the received information associated with the second encrypted data object, responsive to the authentication of the user of the second client device by the second identity provider.

19. An access control management system comprising a memory and a processor, the access control management system operable to perform a method comprising:
- receiving from a first client device, information associated with an encrypted data object;
- receiving from a second client device, a request for the information associated with the encrypted data object;
- verifying that a user of the second client device is identified in the received information associated with the encrypted data object;
- automatically selecting, by the access control management system, an identity provider from a plurality of identity providers, based on a user identifier included in the received information associated with the encrypted data object, the user identifier associated with the user of the second client device;
- automatically requesting, from the selected identity provider, authentication of the user of the second client device; and
- transmitting, to the second client device, the received information associated with the encrypted data object, responsive to the authentication by the selected identity provider;
- instructions to receive, by an access control management system, from the first client device, information associated with a second encrypted data object;
- instructions to receive, by the access control management system, from a third client device, a request for the information associated with the second encrypted data object;
- instructions to verify, by the access control management system, that a user of the third client device is identified in the received information associated with the second encrypted data object;
- instructions to automatically select, by the access control management system, a second identity provider from the plurality of identity providers, based on a second user identifier included in the received information associated with the encrypted data object, the second user identifier associated with the user of the third client device;
- instructions to automatically request, by the access control management system, from the selected second identity provider, authentication of the user of the third client device; and
- instructions to send, to the third client device, the received information associated with the second encrypted data object, responsive to the authentication of the user of the second client device by the second identity provider.

* * * * *

UNITED STATES PATENT AND TRADEMARK OFFICE
CERTIFICATE OF CORRECTION

PATENT NO.      : 8,589,673 B2
APPLICATION NO. : 13/340732
DATED           : November 19, 2013
INVENTOR(S)     : William Rodgers Ackerly Page 1 of 1

It is certified that error appears in the above-identified patent and that said Letters Patent is hereby corrected as shown below:

In the Claims
Column 21, line 33, in claim 1, delete "and".
Column 22, lines 6, 9, 14, 18, and 20, in claim 3, delete "third".
Column 23, line 29, in claim 18, delete "and".
Column 24, line 24, in claim 19, delete "and".

Signed and Sealed this
Eighteenth Day of February, 2014

Michelle K. Lee
*Deputy Director of the United States Patent and Trademark Office*